FULK & McLAIN.
Grain Winnower.
No. 3,294.
Patented Oct. 6, 1843.
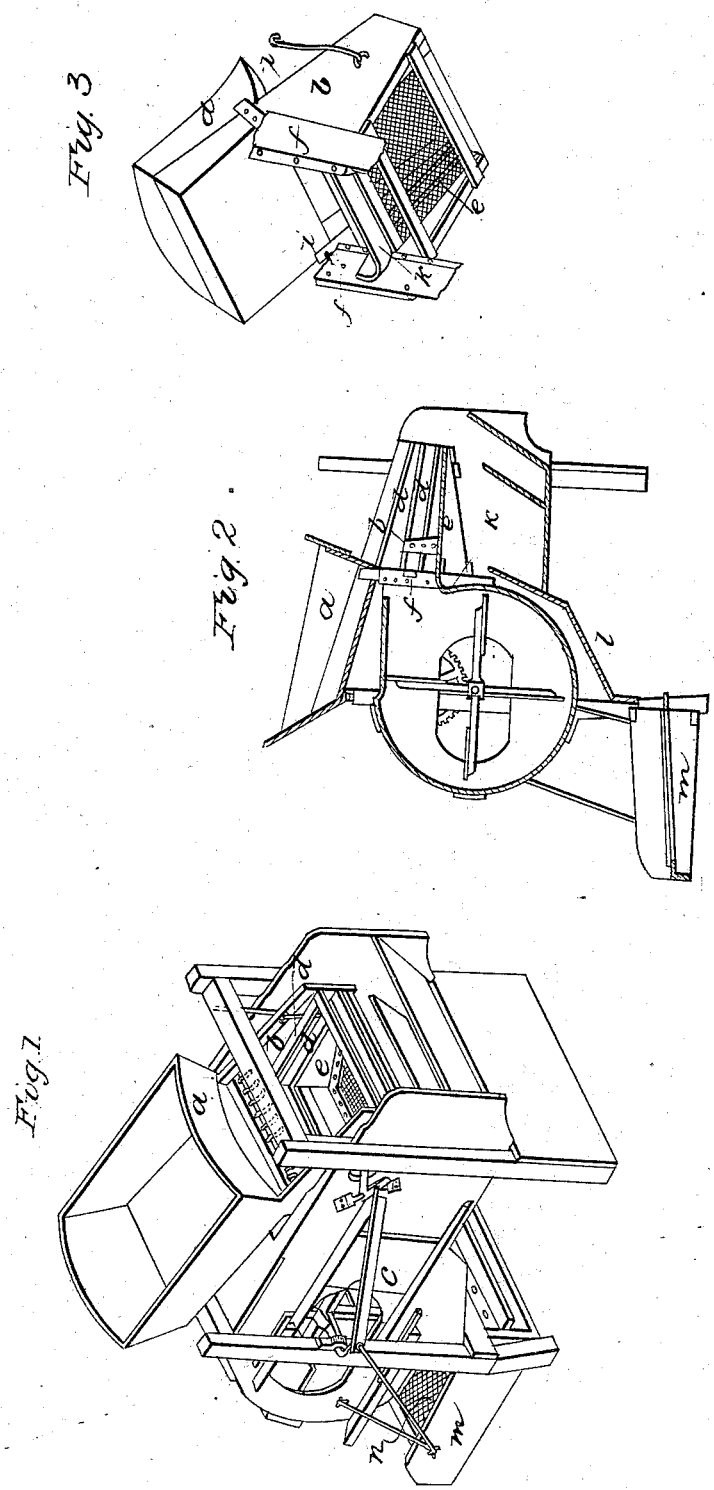

UNITED STATES PATENT OFFICE.

DAVID A. FULK, OF HOOKSTOWN, PENNSYLVANIA, AND LAZARUS B. McLAIN, OF NEW LISBON, OHIO.

FANNING-MILL.

Specification of Letters Patent No. 3,294, dated October 6, 1843.

*To all whom it may concern:*

Be it known that we, DAVID A. FULK, of Hookstown, in the county of Beaver and State of Pennsylvania, and LAZARUS B. McLAIN, of New Lisbon, in the county of Columbiana and State of Ohio, have invented a new and useful Improvement in Machines for Cleaning Grain; and we do hereby declare that the following is a full, clear, and exact description thereof, reference being had to the accompanying drawing, which forms a part of this specification, in which—

Figure 1 is an isometrical view, Fig. 2, a vertical longitudinal section, Fig. 3 shaking shoe and screen, detached.

The nature of our invention consists in connecting a flexible conductor to the sides of the shoe where the air enters so that none of the wind from the fan shall escape without passing through or under the shoe. The lower sieve, or screen, at the end next the fan can be elevated or depressed so as to alter its inclination as the work requires; a shaking screen is also attached below the fan in front.

The frame and casing is constructed similar to wheat fans now in common use as shown in Fig. 1. The fan is made to turn so as to give an over blast, which we prefer, but the improvement can be applied to under blast fans if desired. The hopper ($a$) is attached to the shoe ($b$) and vibrates with it. The latter is formed in the ordinary way and suspended just before the orifice of egress of the fan case; it is moved by means of a crank and pitman ($c$) on the fan shaft which connect with the common bell crank fixture which is attached to the shoe. The shoe contains two riddles ($d$) and a screen ($e$) below them, which last named screen ($e$) is jointed to the shoe so that its front end next the fan can be raised or lowered so as to change its angle at pleasure, by which means the grain can be made to run over it faster or slower as the case may require. To each side of the front end of the shoe next the fan a strip of leather or other flexible material ($f$) is attached by the edge, the other edge being fastened in any convenient way to the side of the case inclosing the shoe. There is also a small piece ($i$) attached to the under side of the bottom of the hopper near the riddles to close the openings at that point on each side and when the over blast is used the lower screen has an apron ($k$) hanging down from it at its front edge. These prevent the escape of the blast from the fan in any direction before it passes through the grain and saves about 20 per cent. of the wind which is all lost during the same operation by the ordinary machine. In the under blast fan the apron ($k$) on the screen is dispensed with. From the screen the grain is conveyed by a conducting board ($l$) to the front of the machine under the fan where it is received onto another shaking screen ($m$) hung at that end below said conductor where it is thoroughly screened. The screen ($m$) is shaken by means of the crank on the fan shaft which is connected therewith by a pitman ($n$).

What we claim as our invention and desire to secure by Letters Patent is:

1. The employment of a flexible conductor for guiding the air into, and between the screens in the shoe, constructed and arranged substantially in the manner, and for the purpose hereinbefore specified.

2. We claim the movable screen ($e$) in combination with the above, one end of which can be raised or lowered as above set forth.

3. We claim in combination with the above the additional screen and shaking shoe combined with the fan in the manner and for the purpose as described.

DAVID A. FULK.
LAZARUS B. McLAIN.

Witnesses to the signature of D. A. Fulk:
ROBT. M. FERRAN,
DANIEL S. KELLY.

Witnesses to the signature of L. B. McLain:
JOSEPH HARTMAN,
EDWARD CARROLL.